(12) United States Patent
Yuan et al.

(10) Patent No.: US 8,381,173 B2
(45) Date of Patent: Feb. 19, 2013

(54) PLATFORM-INDEPENDENT METHOD AND SYSTEM FOR DEPLOYING CONTROL LOGIC PROGRAMMING

(75) Inventors: Chengyin Yuan, Rochester Hills, MI (US); Stephan R. Biller, Birmingham, MI (US); Chieh-Yi Jerry Yen, Rochester Hills, MI (US); Fangming Gu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 949 days.

(21) Appl. No.: 12/399,090

(22) Filed: Mar. 6, 2009

(65) Prior Publication Data

US 2010/0229151 A1    Sep. 9, 2010

(51) Int. Cl.
*G06F 9/44*    (2006.01)
(52) U.S. Cl. .................. 717/104; 717/106; 717/136
(58) Field of Classification Search .................. 717/104
See application file for complete search history.

(56) References Cited

U.S. PATENT DOCUMENTS

| | | | | |
|---|---|---|---|---|
| 6,442,441 | B1* | 8/2002 | Walacavage et al. | 717/104 |
| 7,451,003 | B2* | 11/2008 | Chester et al. | 700/28 |
| 2006/0143602 | A1* | 6/2006 | Rothman et al. | 717/106 |
| 2009/0083699 | A1* | 3/2009 | Santhanam | 717/106 |
| 2009/0178025 | A1* | 7/2009 | Morrow et al. | 717/136 |
| 2009/0182442 | A1* | 7/2009 | Sethuraman et al. | 700/86 |
| 2009/0235226 | A1* | 9/2009 | Murthy et al. | 717/104 |
| 2010/0083213 | A1* | 4/2010 | Chouinard et al. | 717/104 |
| 2011/0185371 | A1* | 7/2011 | Brown et al. | 717/136 |

OTHER PUBLICATIONS

Gaonan Zhang, Intersymbol Decorrelating Detector for Asynchronous CDMA Networks with Multipath, 2005, ACM, 19 pages, <URL: http://delivery.acm.org/10.1145/1090000/1088738/p419-zhang.pdf>.*

Alessandro Marongiu, Parallel Dedicated Hardware Devices for Heterogenous Computations, 2001, ACM, 9 pages, <URL: http://delivery.acm.org/10.1145/590000/582063/p29-marongiu.pdf>.*

M. Ayala-Rincon, Prototyping Time- and Space-Efficient Computations of Algebraic Operations over Dynamically Reconfigurable Systems Modeled by Rewriting-Logic, 2006, ACM, 31 pages, <URL: http://delivery.acm.org/10.1145/1150000/1142156/p251-ayala_rincon.pdf>.*

Jose Reinaldo Silva, Modeling Extended Petri Nets Compatible with GHENeSys IEC61131 for Industrial Automation, 2008, Google Scholar, 11 pages, <URL: http://www.springerlink.com/content/e170414m0k6g3442/fulltext.pdf>.*

Ricardo Sanfelice, A Hybrid Systems Modeling Framework for Embedded Computing, 2009, Google Scholar, 10 pages, <URL: http://cseweb.ucsd.edu/~kastner/papers/tech-hybrid_embedded_modeling.pdf>.*

(Continued)

*Primary Examiner* — Thuy Dao
*Assistant Examiner* — Hua Lu
(74) *Attorney, Agent, or Firm* — Quinn Law Group, PLLC

(57) ABSTRACT

A system for generating platform-specific control logic implementation code for execution on a programmable logic controller (PLC) platform includes a plurality of processing layers. A first layer models generic control requirements as a unitary mathematical model (UMM). A second layer translates the UMM into generic control code describing a platform-independent set of generic control functions following an open structured language. A third layer automatically transforms the generic control functions into the platform-specific implementation code executable on different PLC platforms. A method of generating the implementation code includes modeling control requirements as a mathematical model, transforming the model into platform-independent control code describing a predetermined set of generic control functions using Extensible Markup Language (XML) schema, and automatically transforming the generic control functions into the implementation code.

9 Claims, 2 Drawing Sheets

OTHER PUBLICATIONS

Jozsef Vasarhelyi, Design Method for Vector Control System Implementations, 2009, Google Scholar, 6 pages, <URL: http://www.ines-conf.org/ines-conf/72_INES2004.pdf>.*

Estevez, E. et al., Building PLC automation projects from IEC 61131-3 software architecture, Factory Communication Systems, IEEE International Workshop on, S.362-367, 2006 IEEE Xplore [online]. DOI:10.1109/WFCS.2006.1704180, in: IEEE.

* cited by examiner

PLATFORM-INDEPENDENT METHOD AND SYSTEM FOR DEPLOYING CONTROL LOGIC PROGRAMMING

TECHNICAL FIELD

The invention relates generally to a framework for deploying control logic programming, and in particular to an automated method and system for converting generic high-level control requirements into production-ready and platform-specific implementation code.

BACKGROUND OF THE INVENTION

A programmable logic controller or PLC is a special purpose digital computing machine or device used for controlling the operation of an electromechanical system and/or associated process. A detailed software program or set of implementation code specifies the precise manner in which a particular machine or process is to operate, and is compiled and downloaded from a host machine or computer to a memory location aboard the PLC prior to execution. Once the implementation code is downloaded to the PLC, the PLC is switched over to run mode, and the ensuing control sequence is executed automatically until such time as the implementation code is interrupted or stopped.

While a PLC provides notable performance advantages, such as reliability and robustness, the software or implementation code needed for operation thereof is typically proprietary in nature or vendor/platform-specific. That is, implementation code that is uniquely written for execution on hardware provided by Vendor A is ordinarily not readily executable on hardware provided by Vendor B. This general lack of interchangeability or platform flexibility can be detrimental to manufacturers having a diverse base of operations, and in particular to global manufacturers having a hefty prior investment in widely disparate control-related hardware and software throughout its various manufacturing plants and other facilities.

As noted above, PLC implementation code is typically vendor and/or platform-specific, and therefore manufacturers using a particular brand of hardware and/or software are effectively tied to or reliant on a specific vendor for the provision of any hardware and/or software upgrades. As a result, the costs associated with the acquisition and/or ongoing operations and maintenance of a control system can quickly escalate whenever a critical component or software update must be sole-sourced. Likewise, a given manufacturer's ability to quickly and seamlessly adopt new technology can be affected by vendor-specific or sole-source requirements. While some options exist for minimizing the effects of this general lack of flexibility, such as requiring all vendors to follow a single standard, standardizing all equipment and/or software on a single vendor or provider, and/or developing a software-based coupled translator between different vendor platforms, such solutions can be prohibitively expensive or impracticable for existing manufacturers to implement.

SUMMARY OF THE INVENTION

Accordingly, a platform-independent system and method are provided for seamlessly deploying control applications and associated implementation code for use on different vendor-specific platforms, i.e., onto PLC-related hardware provided by different sources, manufacturers, providers, or other such vendors. The system and method of the invention provide a framework for converting general or high-level control logic into platform-specific and production-ready logic code. A common, generic, or platform-independent methodology is applied to improve the flexibility of an overall or global control system, thus facilitating any related global manufacturing and engineering processes as set forth below.

In particular, the method and system provide for a plurality of distinct levels or layers of software and related controls methodology. In one embodiment, the layers include a first processing layer, referred to herein as high-level generic logic layer (HLL), a second or intermediate processing layer, referred to herein as a vendor-neutral logic layer (VNL), and a third processing layer, referred to herein as a platform-specific deployment layer (PDL). A user or developer could also merge the first and second layer, or the second and third layer, without departing from the intended scope of the invention.

Within the HLL, each general or top-level requirement, i.e., any required human, machine, process, safety, and/or other control information is automatically processed or transformed into a representative mathematical model, referred to herein as a Unitary Mathematical Model (UMM), using, by way of example, modeling software, a finite state machine, a Petri net, and/or any other suitable mathematical modeling process or technique. Various individual mathematical models can be computed to generate the single complete math model or UMM, which is a comprehensive mathematical model representing the entire global or control system of a given environment. As noted above, the UMM considers all of the relevant process requirements for subject areas such as device behavior, human operation, safety and/or operational constraints, etc. The UMM is then sent to the second processing layer, i.e., the vendor-neutral logic layer or VNL, as input to generate vendor-neutral low level application code.

Within the VNL, an established database or library containing generic logic code for a predetermined set of the most commonly utilized control functions or commands, i.e., open valve, close valve, start robot program, stop conveyor, etc., as well as an application model for translating the UMM into vendor-neutral application code. Open structured format such as but not limited to Extensible Stylesheet Language Transformations (XSLT) and Extended Markup Language (XML) schema are applied to the UMM to enable the necessary data integration and validation, such that the generic implementation code that is ultimately output from the VNL to the third processing layer or PDL is provided in an entirely vendor-neutral or platform-independent, XML-based format.

Within the PDL, the generic code and any necessary library components from the second processing layer or VNL are used as inputs for the generation of vendor-specific or platform-specific implementation code. To that end, a corresponding XML-based code adapter, which can be embodied as any necessary processing hardware and associated vendor-provided or vendor-specific translation software, is implemented for each vendor sourced within the overall control system. The vendor-specific or platform-specific implementation code can be generated in terms of any associated inter-operable definition files and/or inter-operable programming languages such as instruction lists (IL), ladder diagrams (LD), sequential function charts (SFC), function block diagrams (FBD), structured text (ST), etc. As an added quality control or code validation step, the generated platform-specific implementation code can be analyzed, such as by comparing the code to a reference standard, the UMM, or by other suitable means, and modified as needed. Thereafter, the implementation code can be deployed to the plant floor, thus minimizing any required plant-level programming and implementation effort, including but not limited to debugging and testing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
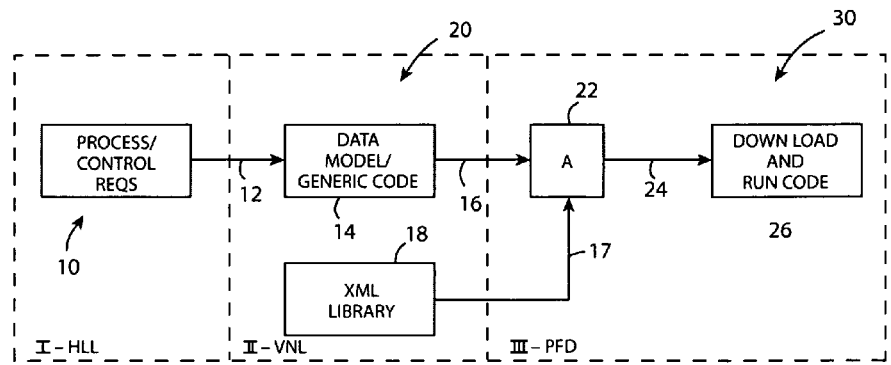
FIG. 1 is a schematic illustration of a three-layer platform-independent methodology or framework in accordance with the invention.

Referring to the drawings, wherein like reference numbers correspond to like or similar components throughout the several figures, and beginning with FIG. 1, a framework for seamlessly employing automatic control applications to various different vendor platforms includes three processing layers: a first processing layer or High-Level Logic Layer (HLL) 10, a second processing layer or Vendor-Neutral Logic Layer (VNL) 20, and a third processing layer or vendor and/or platform-specific Plant Deployment Layer (PDL) 30. That is, the multi-layer framework exemplified in the logic flow diagram of FIG. 1 can be implemented using the system 50 of FIG. 2 described below in order to convert high-level or overarching control requirements and information from a generic form, using automatically-generated mathematical models, into plant-floor or production ready implementation code that can be executed using the hardware of any number of existing programmable logic controllers (PLC), regardless of the manufacturer or vendor.

More particularly, within the HLL 10 there occurs an integration of broad-based control design requirements, data, and information, e.g., requirements related to process layout, broad processing steps, operational research, plant information, or other required data, into a unitary mathematical model (UMM), represented in FIG. 1 as arrow 12. The VNL 20 receives the UMM 12 and processes, translates, or otherwise transforms the UMM 12 into generic or platform-independent control code 16, which is then relayed to the PDL 30. That is, within the VNL 20 a control application and data model 14, hereinafter referred to for simplicity as the control model 14, automatically processes and transforms the UMM 12 into the generic control code 16 using an open structured format, such as a standardized XML-based schema, as explained below. Also within the VNL 20, a database or XML library 18 contains a listing of the more typical or commonly used control functions 17. All solutions can be based in part on International Electrotechnical Commission (IEC) standard IEC 61131-3, as well as any applicable PLC Open-based standards and solutions. The generic code 16 and any necessary control functions 17 are then merged and transmitted to the PDL 30 as data inputs thereto.

The Plant Floor Deployment Layer or PDL 30 includes one or more vendor-specific XML-based adapters 22 which collectively ensure the integration or translation of the generic control code 16 and reusable control components or functions 17 into vendor or platform-specific implementation code 24. The implementation code 24 is then deployed to the plant floor, noted generally as step 26 in FIG. 1, by downloading the platform-specific implementation code 24 from a host machine, server, personal computer, or other suitable computing device to a particular PLC platform, and then executing or running the implementation code 24 using that particular PLC.

Figure 2:
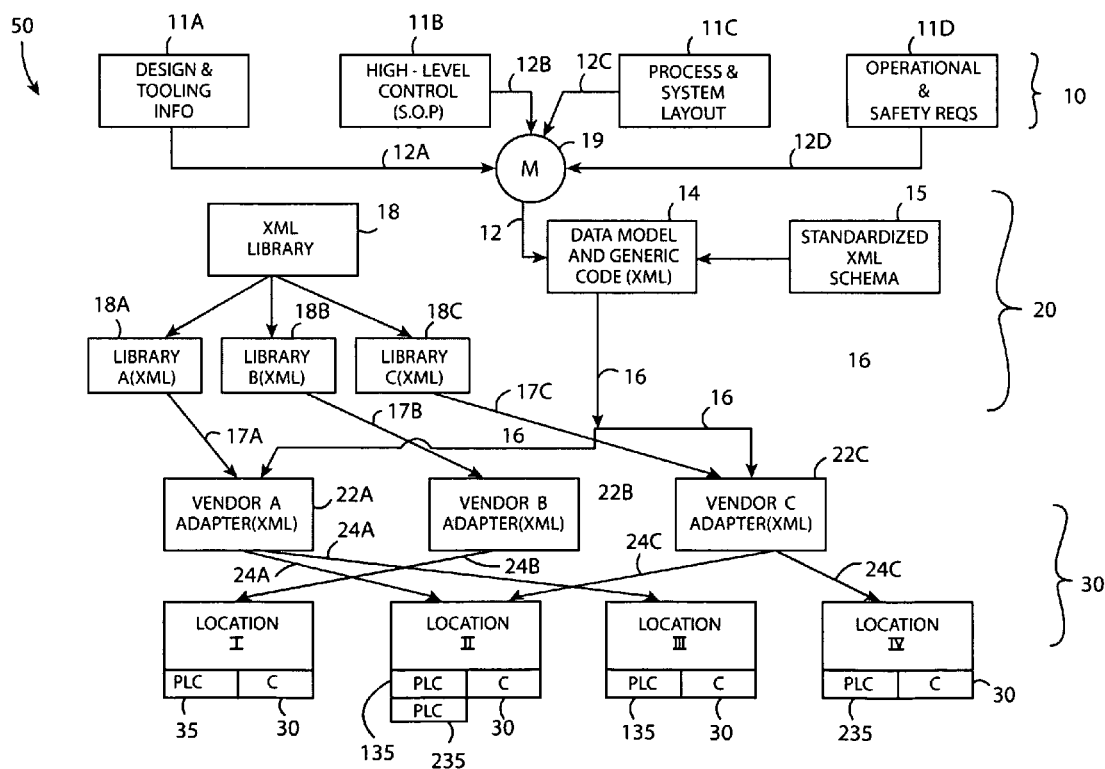
FIG. 2 is a schematic illustration of a system for implementing the platform-independent methodology represented in FIG. 1.

As will be understood by those of ordinary skill in the art, a given PLC, such as the exemplary PLC 35, 135, and 235 of FIG. 2, refers to a computer-based process control device having a microprocessor or central processing unit (CPU), various electronic and/or magnetic memory locations or areas, a power supply, and input/output or I/O sections for receiving and transmitting the various I/O control signals being fed to the PLC by a process being controlled thereby. A PLC includes any appropriate control circuitry necessary for executing predetermined control sequences in response to one or more input control variables in order to produce a desired output response. In this manner, a PLC checks the status of various inputs, usually by reading values determined by sensors positioned with the process being controlled, executes a function, updates the output status, and then repeats.

While primary control functions for execution by a PLC can be represented schematically using ladder logic, e.g., by graphically or symbolically depicting load, load bar, out, out bar, or other control instructions, the implementation code underlying such symbolic representations is decidedly more complex, and as noted above, is ordinarily proprietary or vendor-specific. That is, implementation code from Vendor A cannot be readily executed on hardware provided by Vendor B, and vice versa. This lack of interchangeability can be counteracted by application of the framework shown in FIG. 1 using the exemplary system 50 of FIG. 2, which will now be explained in detail.

Referring to FIG. 2, and beginning with the HLL 10, upstream process and control information can be segregated by subject area, such as mechanical design and tooling information 11A, high-level sequence of operations (SOP) 11B, process and system layout requirements 11C, and operational and safety requirements 11D, to name just a few typical subject areas. Within the HLL 10, associated personnel for the respective subject areas, e.g., process engineers, industrial engineers, tool engineers, safety personnel, foremen, supervisors, etc., can specify or define overarching or broad process requirements. These requirements are automatically converted into a corresponding representative mathematical model 12A, 12B, 12C, and 12D, respectively, for that particular subject area. A mathematical composition and analysis module (M) 19 ultimately consolidates the models 12A, 12B, 12C, and 12D into a unitary mathematical model, i.e., the UMM 12, as a single mathematical model representing or modeling the entire control process.

The VNL Layer 20 receives the UMM 12 generated by the HLL 10 as an input. The VNL 20 includes the generic XML library 18, as well as the control model 14 described above. The control model 14 is in communication with a predetermined XML schema 15. As will be understood by those of ordinary skill in the art, a definition file or schema is a built-in data type that constrains any text used for communicating within a system such as the system 50 of FIG. 1. A schema, and in particular an XML schema, is a description of a type of XML document, typically expressed in terms of constraints on the structure and content of documents of that type, above and beyond the basic syntactical constraints imposed by XML itself. An XML schema provides a view of the document type at a relatively high level of abstraction. The XML schema should be compatible to industrial standards, such as PLC Open (plcopen.org), in conjunction with IEC 61131, i.e., the current global standard for industrial control programming, or using another suitable industry-standard or public domain data specification. However developed, the standardized schema clearly defines the various elements and/or attributes that are allowed to appear in the resultant document, the order and/or number of the elements usable in the document, and whether a particular element is to remain empty or can include text.

The generic XML library 18 contains the more common detailed control steps or functions, which likewise are predefined using the XML schema. For example, control commands such as "conveyor start to move forward", "conveyor reach target position", "conveyor stop", "trigger sensor", etc., can each be represented in generic XML code and stored or recorded within the generic library 18. Also within the scope of the invention, the generic XML library 18 can be compartmentalized or divided into sub-libraries 18A, 18B, 18C, with each sub-library 18A, 18B, and 18C corresponding to a particular supplier or vendor. Such compartmentalization could be useful, for example, if certain control commands are uniquely suited for use with hardware of a particular vendor.

Still referring to the VNL 20 of FIG. 2, the control model 14 processes, translates, or otherwise transforms the UMM 12, using the XML schema 15, into the generic control code 16 in XML format. This generic control code 16 is ultimately integrated with the XML-based common functions 17 that are output from the XML library 18, with the generic control code 16 and functions 17 defining the input values into the PDL 30.

Once the generic control code 16 and the functions 17 have been relayed to the PDL 30, the generic control code 16 and the functions 17 are automatically processed within a corresponding vendor-specific adapter module or adapter 22A, 22B, 22C. That is, the adapter 22 shown in FIG. 1 can be embodied as a plurality of different adapters, with the reference numbers 22A, 22B, and 22C referring to an exemplary set of three different vendors A, B, and C. Therefore, where sub-libraries 18A, 18B, and 18C are used, the functions 17A, 17B, and 17C corresponding to the sub-libraries 18A, 18B, and 18C, respectively, are transmitted to the appropriate vendor.

Still referring to FIG. 2, each of the adapters 22A, 22B, and 22C is operable for translating the generic control code 16 and functions 17 into corresponding vendor-specific implementation code 24A, 24B, and 24C that is uniquely suited for running on hardware provided by that particular vendor. Once so adapted, the implementation code 24A, 24B, 24C can be deployed to a particular location using hardware and software of one or more of the vendors.

For example, Location I could represent a production base in North America using PLC hardware and software provided by Vendor B, represented as the PLC 35, while Location II in Latin America uses PLC hardware and software provided by Vendors A and C, i.e., PLC 135 and 235. Likewise, Location III can represent Europe, using only PLC hardware and software provided by Vendor A, i.e., PLC 135. Finally, Location IV can represent the Asia-Pacific region, wherein only PLC hardware and software provided by Vendor C, i.e., PLC 235 is used. At each location a computer (C) 30, i.e., a computing device, host machine, and/or server used in the control-related manufacturing systems, can be used as a platform from which to download the required implementation code to the PLC hardware.

Figure 3:
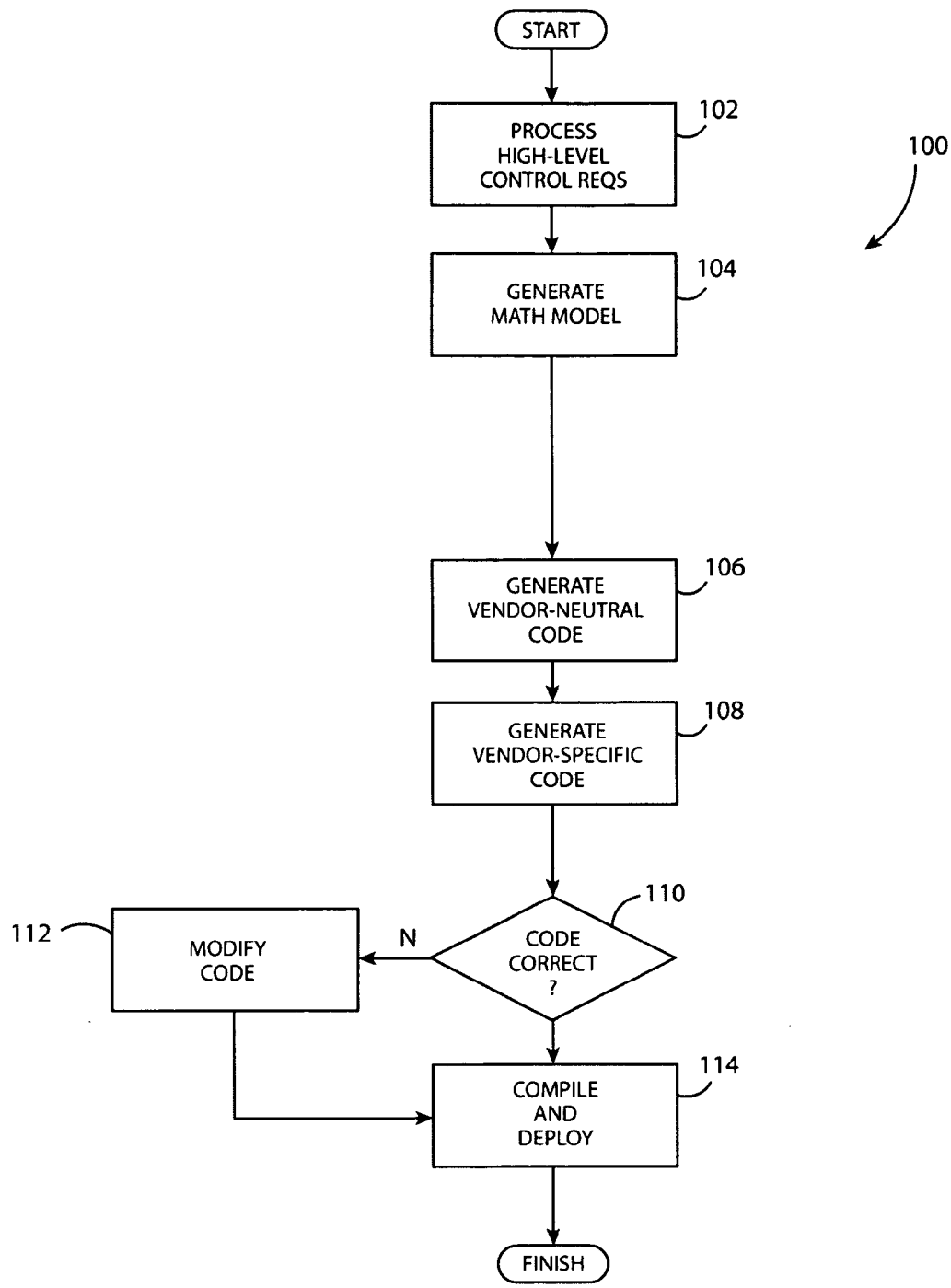
FIG. 3 is a graphical flow chart describing an algorithm for deploying platform-independent control logic programming using the system of FIG. 1.

Referring to FIG. 3 in conjunction with the system 50 of FIG. 2, an algorithm 100 is shown for seamlessly deploying control applications onto disparate vendor platforms as set forth above.

Beginning at step 102, any high-level process requirements, such as shown at 11A, 11B, 11C, and 11D, are determined and captured, for example by writing a control-related specification, using logic flow diagrams, etc. Once captured, the algorithm 100 proceeds to step 104.

At step 104, each requirement of step 102 is automatically transformed into a representative mathematical model. Various means exist for executing step 104, including but not limited to the use of a finite state machines, Petri net, or other suitable modeling tools or computation models. The models generated at step 104 can be combined or integrated into a single model, referred to above as the UMM 12. After generating the UMM 12, the algorithm 100 proceeds to step 106.

At step 106, the UMM 12 is ultimately converted or transformed into XML-based code using the XML schema 15 and the generic or platform-independent XML library 18 as described above. The resultant vendor-neutral or platform-independent control code is transmitted to the PDL 30, and the algorithm 100 proceeds to step 108.

At step 108, using the adapters 22A, 22B, 22C the vendor-neutral code from the VNL 20, i.e., the generic code 16 and functions 17A, 17B, 17C, are translated into vendor-specific or platform-specific control logic implementation code that is suitable for use on the PLC hardware and software of a particular vendor. For example, each adapter 22A, 22B, 22C can contain a unique program which receives the generic code 16 and functions 17A, 17B, 17C, process this information to determine a matching or corresponding set of code that will run properly on that vendor's hardware, and output the required platform-specific implementation code. After generating the implementation code, the algorithm 100 proceeds to step 110.

At step 110, a quality control check can be made to the implantation code generated at step 108 in order to verify that such code will run properly when executed. That is, each production location could have site-unique variables that may render imprudent a direct downloading of implementation code. A local controls engineer or other personnel or device can manually or automatically compare the implementation code to a standard, can run an off-line test, or perform whatever other steps are needed to properly verify the accuracy of the code generated at step 110. If the code is incorrect, the algorithm 100 proceeds to step 114. Otherwise, the algorithm 100 proceeds to step 112.

At step 112, the implementation code can be modified as needed to properly fit the unique control requirements of the location. Once modified, the algorithm 100 proceeds to step 114.

At step 114, the implementation code can be compiled and deployed. That is, the implementation code 24A, 24B, 24C can be compiled via the computer (C) 30 described above, and downloaded to the appropriate PLC 35, 135, and/or 235 for that particular vendor.

While the best mode for carrying out the invention has been described in detail, those familiar with the art to which this invention relates will recognize various alternative designs and embodiments for practicing the invention within the scope of the appended claims.

The invention claimed is:

1. A method of generating a set of platform-specific control logic implementation code suitable for execution by a corresponding programmable logic controller in a control environment:

modeling a plurality of control requirements as a unitary mathematical model (UMM) in a first processing layer using a processor and a software-based modeling application, wherein the UMM represents the control environment;

pre-populating a second processing layer, which is in communication with the first processing layer, with generic code for a predetermined set of commonly used control functions, wherein the second processing layer is configured to receive the UMM from the first processing layer and transform the UMM, using the generic code, into platform-independent control code describing a predetermined set of generic control functions using an Extensible Markup Language (XML) schema;

receiving the UMM from the first processing layer via the second processing layer;

transforming the UMM, using the generic code, into the platform-independent control code; and automatically transforming, in a third processing layer having an XML-based code adapter having processing hardware, the predetermined set of generic control functions, via the XML code adapter, into the set of platform-specific control logic implementation code;

wherein the second processing layer includes:
- a library of XML-based control code for executing a plurality of common control functions, the library providing a first portion of the set of platform-independent control code; and
- a data model for transforming the UMM into a second portion of the platform-independent control code; and wherein the XML-based code adapter is configured to receive and process, via processing hardware, the first and second portions of the set of platform-independent control code from the second processing layer to thereby generate the set of platform-specific control logic implementation code.

2. The method of claim 1, wherein the software-based modeling application uses at least one of a finite state machine and a Petri net.

3. The method of claim 1, wherein automatically transforming the set of mathematical models into platform-independent control code includes accessing the library of pre-populated generic XML-based control code to thereby reuse a plurality of common control functions.

4. The method of claim 1, wherein the set of platform-specific set of control logic implementation code includes at least one of: an instruction list, a ladder diagram, a sequential function chart, structured text, and a function block diagram.

5. A system for generating a set of platform-specific control logic implementation code suitable for execution by a corresponding programmable logic controller (PLC) platform in a control environment, the system comprising:

a first hardware processing layer configured to model a plurality of control requirements as a unitary mathematical model (UMM) that represents the control environment;

a second processing layer in communication with the first processing layer, wherein the second processing layer is pre-populated with generic code for a predetermined set of commonly used control functions, and is configured to receive the UMM from the first processing layer and to transform the UMM, using the generic code, into platform-independent control code describing a predetermined set of generic control functions using an Extensible Markup Language (XML) schema; and a third processing layer having an XML-based code adapter for automatically transform the predetermined set of generic control functions into the set of platform-specific control logic implementation code;

wherein the second processing layer includes:
- a library of XML-based control code for executing a plurality of common control functions, the library providing a first portion of the set of platform-independent control code; and
- a data model for transforming the UMM into a second portion of the platform-independent control code; and wherein the XML-based code adapter is configured to receive and process, via processing hardware, the first and second portions of the set of platform-independent control code from the second processing layer to thereby generate the set of platform-specific control logic implementation code.

6. The system of claim 5, wherein the third processing layer includes a plurality of different platform-specific code adapters each having a corresponding set of platform-specific software configured for transforming the predetermined set of generic control functions into a platform-specific subset of the platform-specific logic implementation code.

7. The system of claim 5, wherein the set of platform-specific control logic implementation code includes at least one of: an instruction list, a ladder diagram, a sequential function chart, structured text, and a function block diagram.

8. The system of claim 5, wherein the third processing layer is configured for comparing the platform-specific control logic implementation code to the UMM in order to determine a variance therebetween.

9. The system of claim 5, wherein the first processing layer utilizes one of a finite state machine and a Petri net for modeling the plurality of control requirements as the UMM.

* * * * *